(12) United States Patent
Bishtein et al.

(10) Patent No.: US 9,350,239 B2
(45) Date of Patent: May 24, 2016

(54) SPLIT-SWITCHER VOLTAGE REGULATOR ARCHITECTURE

(71) Applicant: Broadcom Corporation, Irvine, CA (US)

(72) Inventors: Vadim Bishtein, Sunnyvale, CA (US); Eric Martin Hayes, Fort Collins, CO (US); Kerry Thompson, Fort Collins, CO (US); Walter Soto, San Clemente, CA (US); Stephen Douglas Cook, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 313 days.

(21) Appl. No.: 13/925,567

(22) Filed: Jun. 24, 2013

(65) Prior Publication Data

US 2014/0266094 A1    Sep. 18, 2014

Related U.S. Application Data

(60) Provisional application No. 61/799,476, filed on Mar. 15, 2013.

(51) Int. Cl.
*H02M 3/158* (2006.01)
*G06F 1/26* (2006.01)
*H02M 1/00* (2006.01)

(52) U.S. Cl.
CPC .............. *H02M 3/158* (2013.01); *G06F 1/26* (2013.01); *H02M 2001/0025* (2013.01)

(58) Field of Classification Search
CPC .. G06F 1/26; H02M 2001/0025; H02M 3/158
USPC ........................................................ 323/271
See application file for complete search history.

(56) References Cited

U.S. PATENT DOCUMENTS

| | | | |
|---|---|---|---|
| 6,211,727 B1* | 4/2001 | Carobolante ................. | 327/543 |
| 8,461,869 B1* | 6/2013 | Rahim et al. .................... | 326/33 |
| 9,224,491 B1* | 12/2015 | Somaiya .......... | H01L 27/11582 |
| 2005/0088466 A1* | 4/2005 | Smith et al. ....................... | 347/5 |
| 2010/0073095 A1* | 3/2010 | Hirano ............................ | 331/34 |
| 2012/0119788 A1* | 5/2012 | Turner et al. .................... | 327/57 |
| 2012/0281447 A1* | 11/2012 | Heo et al. ......................... | 363/74 |
| 2014/0036734 A1* | 2/2014 | Fong et al. .................... | 370/276 |
| 2014/0191802 A1* | 7/2014 | Li ......................... | H03F 3/2171 |
| | | | 330/251 |
| 2014/0266143 A1* | 9/2014 | Saint-Laurent et al. ...... | 323/351 |

OTHER PUBLICATIONS

Circuits and Systems, 2007. ISCAS 2007. IEEE International Symposium on; Jeabin Lee et al. Department of EECS, Korea (KAIST).*

* cited by examiner

*Primary Examiner* — Thomas Lee
*Assistant Examiner* — Chad Erdman
(74) *Attorney, Agent, or Firm* — Sterne, Kessler, Goldstein & Fox P.L.L.C.

(57) ABSTRACT

A power management system that can include an application processor and a power management unit (PMU). The PMU can generate a regulated output voltage based on control signals generated by a switch control module of the application processor. The control signals can be determined based on a comparison of monitored voltages within the application processor and a generated reference voltage. The reference voltage can be generated based on fed back signals corresponding to the control signals. The application processor and the PMU can be formed utilizing different size manufacturing process technologies. For example, the PMU can be formed utilizing a larger size manufacturing process technology than the application processor.

20 Claims, 6 Drawing Sheets

SPLIT-SWITCHER VOLTAGE REGULATOR ARCHITECTURE

CROSS REFERENCE TO RELATED APPLICATIONS

This patent application claims the benefit of U.S. Provisional Patent Application 61/799,476, filed Mar. 15, 2013, entitled "Split-Switcher Voltage Regulator Architecture," which is incorporated herein by reference in its entirety.

This patent application also relates to U.S. Provisional Patent Application. No. 61/799,558, filed Mar. 15, 2013, entitled "Partitioned Switch Mode Power Supply (SMPS) Interface," and to U.S. patent application Ser. No. 13/925,586 filed on the same day as the present application, entitled "Partitioned Switch Mode Power Supply (SMPS) Interface," each of which is incorporated herein by reference in its entirety.

FIELD

This application relates generally to power management, and more particularly to voltage regulation utilizing a split-switcher architecture.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
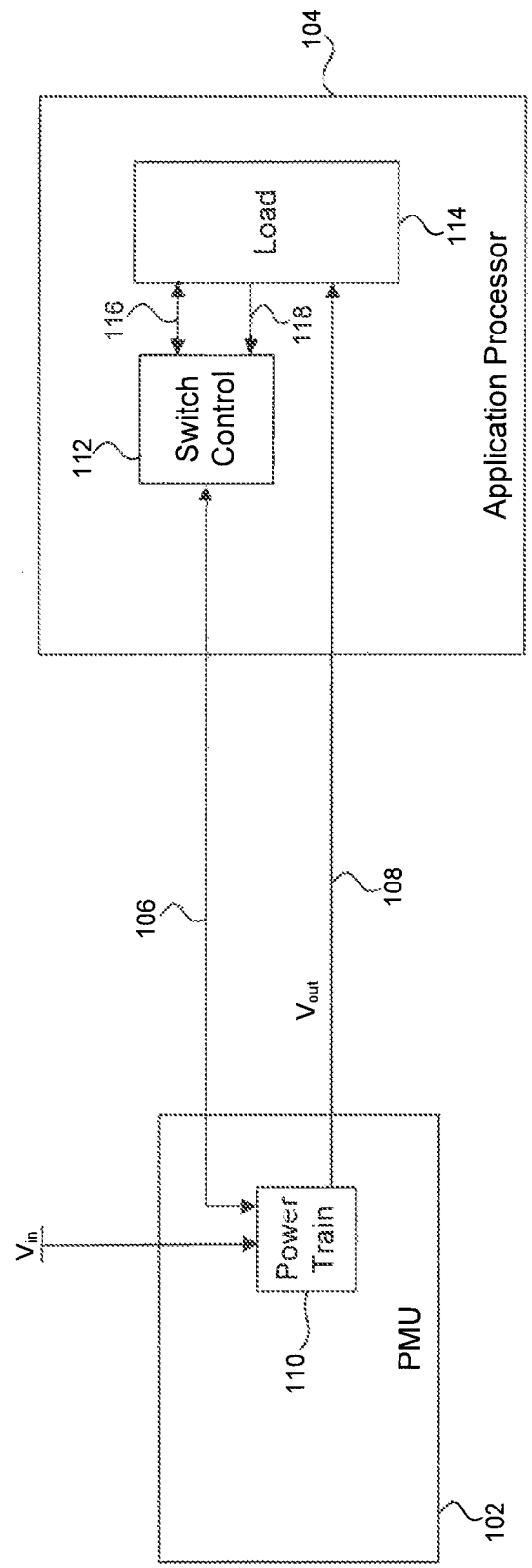
FIG. 1 illustrates a power management system in accordance with an exemplary embodiment of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For purposes of this discussion, the term "module" shall be understood to include at least one of software, firmware, and hardware (such as one or more circuits, microchips, or devices, or any combination thereof), and any combination thereof. In addition, it will be understood that each module may include one or more components within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired and/or wireless manner.

In conventional power management systems, power management is performed utilizing a voltage regulator module that includes one or more voltage regulators that are configured to provide a regulated supply voltage to one or more components of the system (e.g., the microprocessor (CPU) within an applications processor), and a control circuit that is configured to monitor and adjust the supply voltage.

The power management system can utilize one or more well-known switching regulators to provide the regulated output voltage from a varying input voltage. For example, switching regulators can be implemented in battery powered electronic devices to regulate the battery output voltage which, when charged or discharged, can be greater than, less than, or substantially the same as the desired output voltage.

Conventional switching regulators generally have one or more power switches (e.g., field effect transistors (FET)) and an inductor-capacitor (LC) filter coupled between the unregulated input and the regulated output. In operation, the control circuit selects the switching regulator configuration (i.e., the operating mode) by controlling positions of the power switches and the duration of time during which switch positions remain unchanged.

Depending on the switch configurations, the switching regulator can operate as, for example, a buck converter, a boost converter, or a buck-boost converter. A buck converter down-converts an input voltage to a lower output voltage. The power switches operating in a buck converter configuration alternately connect the input voltage to and disconnect the input voltage from the input of the LC filter. A boost converter, on the other hand, up-converts an input voltage to a higher output voltage. In the boost converter configuration, the input voltage is continuously connected to the input of the LC filter, but the inductor of the LC filter is alternately connected to and disconnected from the load where the regulated output voltage is applied. A buck-boost converter switches between the buck-converter configuration and the boost converter configuration.

In an exemplary embodiment, a power management system includes a voltage regulator module (that receives the unregulated input voltage source) having both voltage regulators (e.g., power switches) and control circuitry located within a power management unit. In this configuration, the power management unit utilizes remote sensing devices that are configured to remotely sense the supplied voltage on one or more components within the system, including components within one or more application processors. For example, the remote sensing devices can be used to remotely sense the supplied voltage at one or more locations within a central processing unit (CPU) core of an application processor. The remotely-sensed voltage is then communicated to the power management unit via one or more communication lines. The sensed voltage is then communicated back to, and utilized by, the control circuit to regulate the supplied output voltage provided to, for example, the application processor.

In an alternative exemplary embodiment, the power management system includes a voltage regulator module having both voltage regulators (e.g., power switches) and control circuitry located within an applications processor (i.e., the voltage regulator and control circuitry being externally located with respect to the power management unit). In this configuration, the unregulated input voltage from the power management unit is supplied to the application processor. That is, the unregulated input voltage is supplied to one or more voltage regulators of the voltage regulator module within the application processor. Further, the control circuitry of the voltage regulator module is configured to locally monitor and adjust the supplied output voltage within the application processor.

In an exemplary embodiment, the power management system is configured in a split-switcher architecture that includes a voltage regulator module that is communicatively and/or electrically coupled to an externally-located application processor. Here, the voltage regulator module includes one or more voltage regulators (e.g., power switches) and the application processor includes control circuitry configured to remotely control the operation of the voltage regulator module. In this configuration, the control circuitry can be configured to locally monitor a regulated voltage supplied to the application processor from the voltage regulator module. For example, the control circuitry can locally sense the regulated voltage at one or more locations within application processor (e.g., locations within a load, CPU core, or the like). Based on these locally sensed voltages, the control circuitry can be configured to remotely control regulated output voltage of the externally-located voltage regulator module via one or more communication lines that communicatively couple the voltage regulator module to the application processor.

In utilizing a split-switcher architecture, the power management system can reduce resistive voltage drops in one or more printed circuit boards (PCB) implemented in the system, in central processing unit (CPU) packaging, and/or in on-die routing to provide some examples. The reduction in resistive voltage drops can improve, for example, the operation voltage margins of the application processor (e.g., the CPU of the application processor), and/or the maximum operating frequency and/or performance of one or more CPUs of the application processor. Further, the split-switcher architecture can reduce the impact of thermal losses generated by the voltage regulators (e.g., power switches) of the voltage regulator module as a result of the segregated architecture.

In an exemplary embodiment, the power management unit is formed utilizing a large feature process (e.g., a large manufacturing process technology) while the application processor is formed utilizing a small feature process (e.g., a small manufacturing process technology). In using a larger size manufacturing process technology, the power management unit can more easily be configured to utilize the higher voltage and/or current implementations typically used in power management units. Conversely, the smaller feature size manufacturing process technology of the application processor is configured to utilize more advanced lower voltage and/or current implementations.

For example, the power management unit is formed utilizing a 0.18 micrometer (μm) manufacturing process technology. The application processor is formed utilizing, for example, a 28 nanometer (nm), 20 nm, or the like manufacturing process technology. The manufacturing process technologies utilized in the formation of the power management unit and the application processor are provided for example only and should not be limited to the above exemplary process sizes, and the process sizes can be any manufacturing process technology as will be apparent to those skilled in the relevant art(s).

FIG. 1 illustrates a power management system 100 in accordance with an exemplary embodiment of the present disclosure. The system 100 includes a power management unit (PMU) 102 communicatively and electrically coupled to an application processor 104 via control signal line 106 and output voltage ($V_{out}$) supply line 108, respectively.

In an exemplary embodiment, the PMU 102 is formed utilizing a larger feature manufacturing process technology with respect to the manufacturing process technology implemented for the application processor 104. As a result, the PMU 102 is formed on (or includes) a semiconductor substrate of a first type having a first feature size and the application processor 104 is formed on (or includes) a semiconductor substrate of a second type having a second feature size, where the first feature size is larger than the second feature size. As known by those skilled in the art, the feature size defines the minimum feature size that can be formed using the respective process. For example, the PMU 102 is formed utilizing a 0.18 μm manufacturing process technology while the application processor 104 is formed utilizing, for example, a 28 nm, 20 nm, or the like manufacturing process technology. In this configuration, communication signal paths and electrical connections between the PMU 102 and the application processor 104 traverse a partition defined by the different manufacturing process technologies.

The PMU 102 includes suitable logic, circuitry, and/or code that is configured to govern various power functions, including, for example, regulating an output voltage, measuring the voltage of one or more power sources (e.g., a battery, AC voltage source, etc.), and/or charging one or more battery power sources.

In an exemplary embodiment, the PMU 102 includes a power train module 110 that includes suitable logic, circuitry, and/or code that is configured to provide a regulated output voltage ($V_{out}$) from a varying input voltage. The input voltage can be provided from an AC voltage source and/or a DC voltage source (e.g., a battery). The power train module 110 includes one or more power switches (e.g., field effect transistors (FET), bipolar junction transistors (BJT), or the like) and an inductor-capacitor (LC) filter coupled between the unregulated input voltage source and the regulated output. In operation, the control of the power switches of the power train module 110 is based on control signals received by the power train module 110 from the application processor 104 (e.g. from a switch control module 112 as discussed below).

The PMU 102 can also include various power management devices, including a charging device configured to regulate the charging of a voltage source (e.g. a battery), and/or a fuel gauge device configured to measure the remaining availability of a voltage source (e.g. the remaining ampere-hours of a battery).

The configuration and operation of the power train module 110 is similar to the configuration and operation of any well-known switching regulator, including, for example, buck converters, boost converters, and/or buck-boost converters. However, the power train module 110 does not include control circuitry to control the regulation of voltage, nor is the control circuitry included in the PMU 102. Rather, as discussed in more detail below, a switch control module 112 is included in the application processor 104 that is configured to monitor and control the regulation of the output voltage ($V_{out}$) of the power train module 110.

The application processor 104 includes suitable logic, circuitry, and/or code that is configured to carry out instructions to perform arithmetical, logical, and/or input/output (I/O) operations of one or more components of the power management system 100, govern various power management functions of the power management system 100 by controlling the operations of the PMU 102 via the control signal line 106.

In an exemplary embodiment, the application processor 104 includes a load 114, such as a central processing unit (CPU) core configured to perform the one or more operations, and a switch control module 112 that is configured to govern various power management functions of the power management system 100, including monitoring one or more points within the application processor 104 and controlling the regulation of output voltage ($V_{out}$) of the PMU 102 (power train circuit 110) based on the results of such monitoring. For the purposes of this discussion, the load 114 of the exemplary embodiments will be described as a CPU core 114. However, it should be appreciated that the load 114 should not be limited to a CPU core, and the load 114 can be any electrical load of the application processor 104 as will be apparent to those of ordinary skill in the relevant art(s). In controlling the regulation of the output voltage ($V_{out}$), the switch control module 112 is configured to provide a control signal to the power train module 110 via the control signal line 106. Further, although a single CPU core 114 has been described, the number of CPU cores should not be limited to a single CPU core, and the application processor 104 can include multiple CPU cores 114 as will be apparent to those skilled in the relevant art(s). In an exemplary embodiment, the switch control module 112 uses one or more pulse-width modulated (PWM) signals to control the operation of the PMU 102, including the operation of the power train module 110.

The switch control module 112 and the CPU core 114 are also configured to communicate with one another via a command signal line 116 and a voltage sensing signal line 118. Further, the switch control module 112 can be configured to control sleep and power functions (on and off) of the power management system 100, monitoring idle states of system components and shutting down unnecessary system components.

The command signal line 116 can include a single or multiple signal paths, and is configured to transmit commands or instructions to the CPU core 114 from the switch control module 112, or to the switch control module 112 from the CPU core 114. The voltage sensing signal line 118 can include a single or multiple signal paths, and is configured to transmit sensed voltage values from one or more points within the CPU core 114 to the switch control module 112. Based on the sensed voltage values, the switch control module 112 is configured to adjust the output voltage ($V_{out}$) of the PMU 102, including the output voltage of the power train circuit 110.

In operation, the switch control module 112 is configured to monitor the sensed voltages at one or more points within the CPU core 114 via the voltage sensing signal line 118 and/or monitor the output voltage ($V_{out}$) of the PMU 102 output from the power train circuit 110. Based on the monitoring of the sensed voltages and/or the output voltage ($V_{out}$), the switch control module 112 adjusts, via one or more control signals transmitted to the PMU 102 via the control signal line 106, the regulation of the output voltage ($V_{out}$) provided by the PMU 102 via the output voltage supply line 108.

Figure 2:
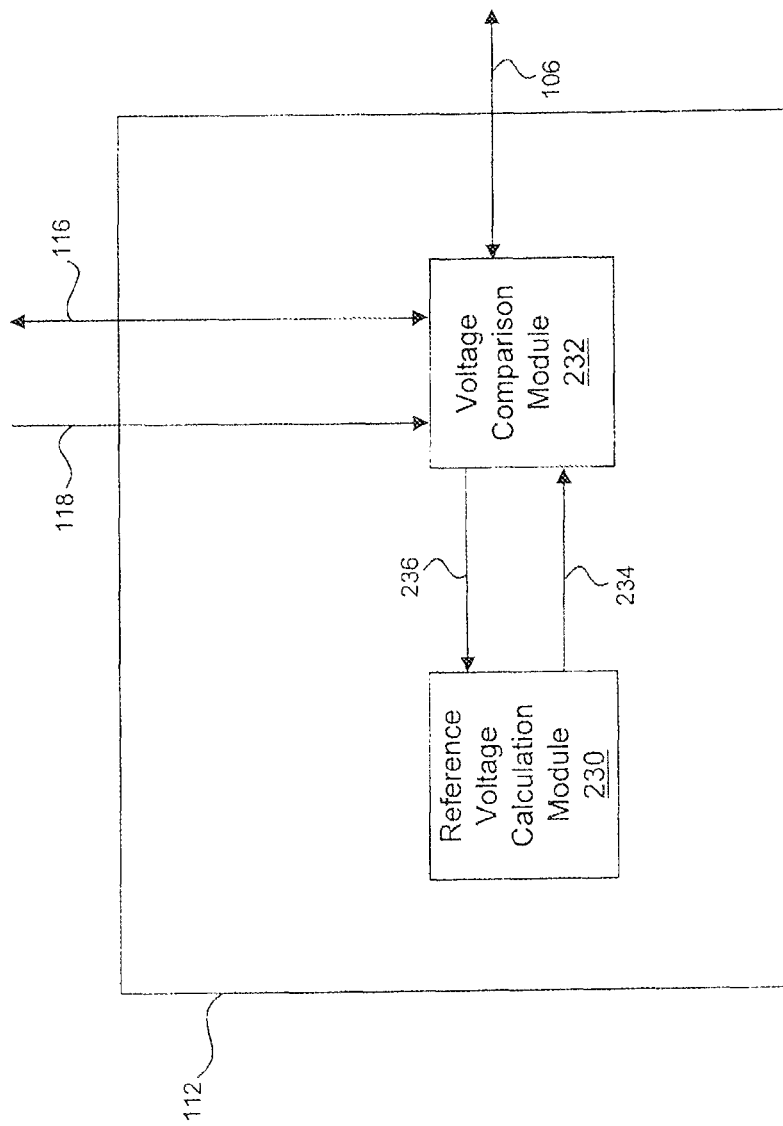
FIG. 2 illustrates a switch control module in accordance with an exemplary embodiment of the present disclosure.

FIG. 2 illustrates switch control module 112 in accordance with an exemplary embodiment of the present disclosure, and that may be implemented within the power management system 100 of FIG. 1. The switch control module 112 includes suitable logic, circuitry, and/or code that is configured to govern various power management functions of the power management system 100, including monitoring voltages at one or more points within the application processor 104, to control the regulation of output voltage ($V_{out}$) of the PMU 102 based on the results of such monitoring, and/or to communicate with the PMU 102 via the control signal line 106.

In an exemplary embodiment, the switch control module 112 includes a reference voltage calculation module 230 communicatively and electrically coupled to a voltage comparison module 232 via a voltage generation control signal line 236 and voltage calculation control signal line 234. The voltage comparison module 232 is also communicatively and electrically coupled to the CPU core 114 of the application processor 104 via voltage sensing signal line 118 and command signal line 116, and commutatively and electrically coupled to the PMU 102 via control signal line 106. The control signal line 106, command signal line 116, voltage sensing signal line 118, voltage generation control signal line 236 and voltage calculation control signal line 234 can each include a single or multiple signal paths.

The reference voltage calculation module 230 includes suitable logic, circuitry, and/or code that is configured to generate one or more voltage calculation control signals, which are utilized by the voltage comparison module 232 to generate a reference voltage ($V_{ref}$). The voltage calculation control signals are determined based on feedback signals fed back to the voltage calculation module 230 that correspond to the control signals transmitted from the voltage comparison module 232 via control signal line 106 to the PMU 102. As discussed in more detail below, the control signals corresponds to a comparison of the reference voltage ($V_{ref}$) and one or more sensed voltages at points within the application processor 104 (e.g., within the CPU core 114). Further, the feedback signals are fed back to the reference voltage calculation module 230 from the voltage comparison module 232 via the voltage generation control signal line 236.

Figure 3:
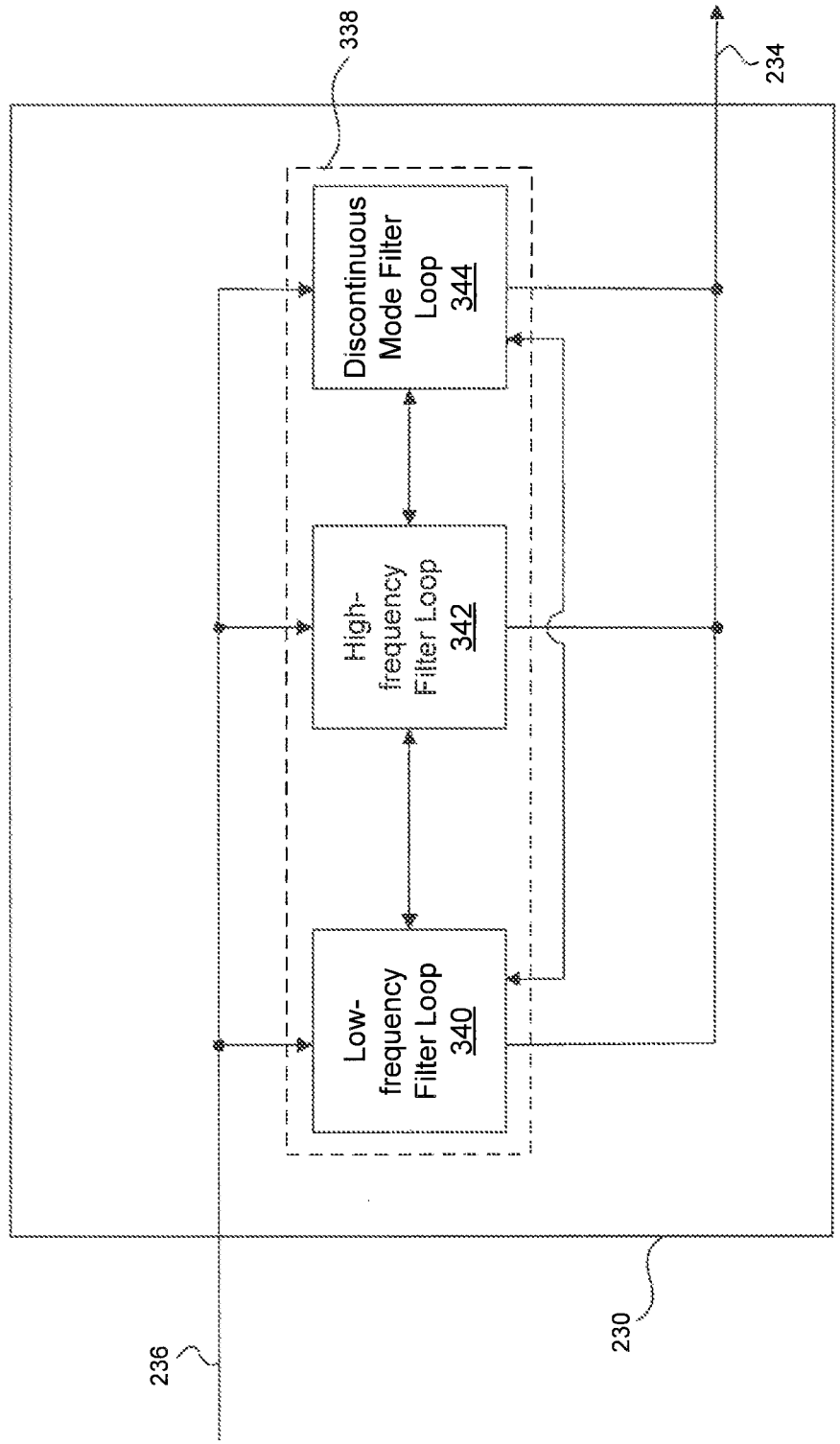
FIG. 3 illustrates a reference voltage calculation module in accordance with an exemplary embodiment of the present disclosure.

FIG. 3 further illustrates the reference voltage calculation module 230 in accordance with an exemplary embodiment of the present disclosure. The reference voltage calculation module 230 includes a low-frequency filter loop 340, a high-frequency filter loop 342, and a discontinuous mode filter loop 344, which collectively are referred to as filter loops 338.

The low-frequency filter loop 340, the high-frequency filter loop 342, and the discontinuous mode filter loop 344 each include suitable logic, circuitry, and/or code that is configured to perform various signal processing functions, including, for example, filtering, digital-to-analog conversion (DAC), analog-to-digital conversion (ADC), slew rate calculation, pulse-width modulation (PWM), amplification, or the like, on feedback signals received from the voltage comparison module 232 (e.g., on signals corresponding to the control signals transmitted via control signal line 106 to the PMU 102). The various signal processing by the filter loops 338 generates one or more voltage calculation control signals that are used by the voltage comparison module 232 to generate the reference voltage ($V_{ref}$).

In an exemplary embodiment, the low-frequency filter loop 340 is configured to perform one or more of the various signal processing functions as discussed above on low-frequency signals supplied to the filter loops 338. For example, the low-frequency filter loop 340 performs signal processing on low-frequency signals (e.g., the feedback signals as discussed above that have low frequencies) that are fed back from the voltage comparison module 232 via the voltage generation control signal line 236. The high-frequency filter loop 342 is configured to perform one or more of the various signal processing functions as discussed above on high-frequency signals supplied to the filter loops 338. For example, the high-frequency filter loop 342 performs signal processing on high-frequency signals (e.g., the feedback signals as discussed above that have high frequencies) that are fed back from the voltage comparison module 232 via the voltage generation control signal line 236. The discontinuous mode filter loop 344 configured to perform one or more of the various signal processing functions as discussed above on signals supplied to the filter loops 338 when the PMU 102 is operating in a discontinuous mode. The PMU 102 operates in a discontinuous mode when the current through an inductor of an LC filter of the power train module 110 is zero or substantially zero (i.e., a high impedance state).

In an exemplary embodiment, one or more of the low-frequency filter loop 340, high-frequency filter loop 342, and discontinuous mode filter loop 344 are configured to perform one or more of the various signal processing functions as discussed above. In particular, the low-frequency filter loop 340, high-frequency filter loop 342, and discontinuous mode filter loop 344 can be configured to independently perform signal processing, or can be configured to cooperatively (two or more of the filter loops) perform the signal processing.

In operation, the filter loops 338 are configured to determine one or more voltage calculation control signals based on feedback signals that are received from the voltage comparison module 232 via the voltage generation control signal line 236. The voltage calculation control signals are generated from one or more of the various signal processing operations of the feedback signals as discussed above. The voltage calculation control signals are then provided to the voltage comparison module 232 via the voltage calculation control signal line 234.

In an exemplary embodiment, the voltage comparison module 232 includes suitable logic, circuitry, and/or code that is configured to monitor voltages at one or more points within the application processor 104 (e.g., within the CPU core 114) via the voltage sensing signal line 118, and to control the regulation of the output voltage ($V_{out}$) from the PMU 102 based on the monitored voltages at the one or more points and the voltage calculation control signals provided by the reference voltage calculation module 230. The voltage comparison module 232 controls the voltage regulation of the PMU 102 by providing one or more control signals to the PMU 102 via the control signal line 106. As discussed above, the PMU 102 regulates the output voltage ($V_{out}$) provided to the application processor 104 (e.g., to the CPU core 114) based on the one or more control signals generated by the voltage comparison module 232 that are received by the PMU 102. In an exemplary embodiment, the control signals generated by the voltage comparison module 232 are pulse-width modulated (PMW) control signals.

Figure 4:
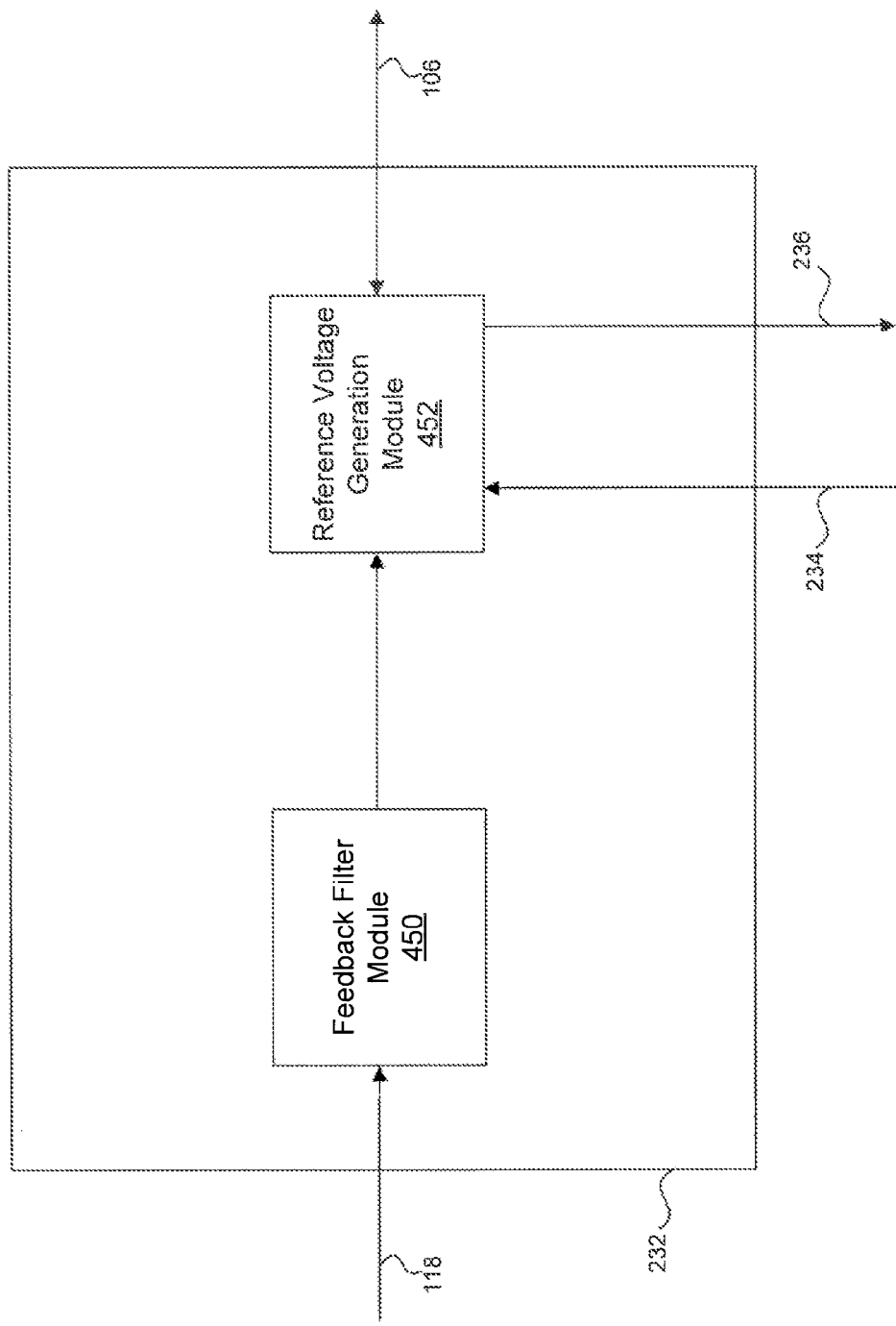
FIG. 4 illustrates voltage comparison module in accordance with an exemplary embodiment of the present disclosure.

FIG. 4 illustrates the voltage comparison module 232 in accordance with an exemplary embodiment of the present disclosure. The voltage comparison module 232 includes a feedback filter module 450 and a reference voltage ($V_{ref}$) generation module 452.

The feedback filter module 450 includes suitable logic, circuitry, and/or code that can be configured to perform various signal processing functions, including, for example, filtering, digital-to-analog conversion (DAC), analog-to-digital conversion (ADC), and amplification. In an exemplary embodiment, the feedback filter module 450 is configured as an active filter that includes, for example, an operational amplifier having one or more capacitors and/or resistors connected to one or more of the inputs and/or the output of the operation amplifier. Further, the inverted input of the operational amplifier is selectively connected to one or more points within the CPU core 114, while the non-inverted input is connected to ground. That is, the inverted input of the operational amplifier receives sensed voltages at one or more points within the CPU core 114. Further, the output of the operational amplifier is connected to the reference voltage generation module 452 to supply a filtered signal (corresponding to the sensed voltages) to the reference voltage generation module 452.

The reference voltage ($V_{ref}$) generation module 452 includes suitable logic, circuitry, and/or code that can be configured to generate a reference voltage ($V_{ref}$) and compare the reference voltage ($V_{ref}$) to signals received from the feedback filter module 450, which correspond to the sensed voltages at one or more points within the CPU core 114. The reference voltage ($V_{ref}$) generation module 452 is also configured to output a control signal 106 to the PMU 102 based on the comparison to control the output voltage ($V_{out}$) of the PMU 102. In an exemplary embodiment, the control signals output to the PMU 102 are pulse-width modulated (PMW) control signals.

In an exemplary embodiment, the reference voltage ($V_{ref}$) generation module 452 includes an operational amplifier configured to compare a filtered signal from the feedback filter module 450 with a generated reference voltage ($V_{ref}$) that is generated based on one or more voltage calculation control signals received from the reference voltage calculation module 238. Further, in an exemplary embodiment, the reference voltage ($V_{ref}$) generation module 452 includes a ramp generator circuit to generate the reference voltage ($V_{ref}$) based on the voltage calculation control signals.

Figure 5:
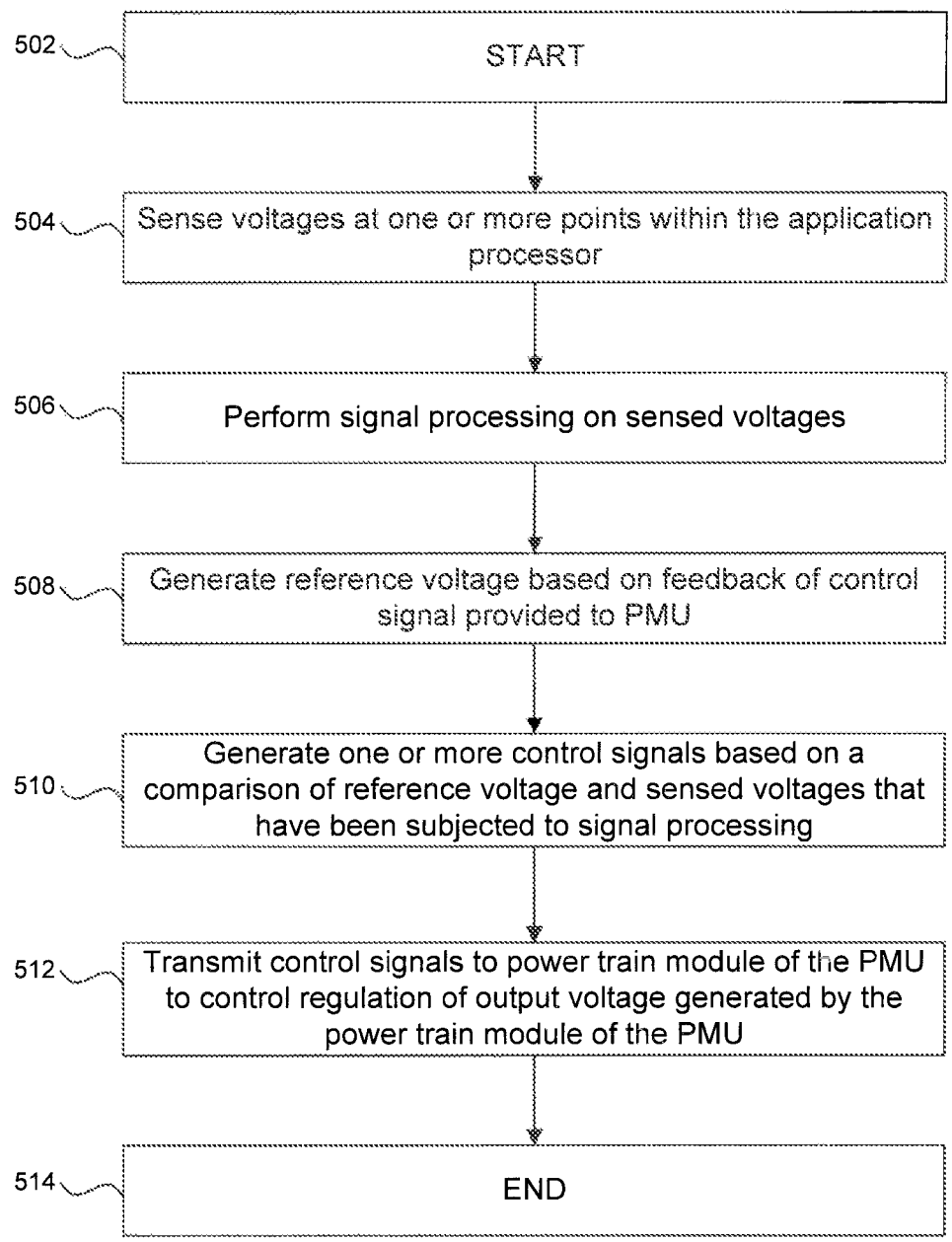
FIG. 5 illustrates a method of power management in accordance with an exemplary embodiment of the present disclosure.

FIG. 5 illustrates a flowchart 500 of a method of power management in an exemplary embodiment of the present disclosure. The method of flowchart 500 is described with continued reference to FIGS. 1-4. The steps of the method of flowchart 500 are not limited to the order described below, and the various steps may be performed in a different order. Further, two or more steps of the method of flowchart 500 may be performed simultaneously with each other.

The method of flowchart 500 begins at step 502 and transitions to step 504, where the switch control module 112 of the application processor 104 senses one or more internal voltages within the application processor 104. For example, the switch control module 112 senses voltages at one or more points within the CPU core 114.

After steps 504, the flowchart 500 transitions to step 506, where the switch control module 112 performs one or more signal processing function on the sensed voltages. For example, the feedback filter module 450 of the voltage comparison module 232 can perform various signal processing functions on the sensed voltages as discussed above.

After steps 506, the flowchart 500 transitions to step 508, where the switch control module 112 generates a reference voltage ($V_{ref}$) based on one or more voltage calculation control signals received from the reference voltage calculation module 230. For example, the voltage calculation control signals are generated by the voltage calculation module 230 based on feedback signals that are fed back from the voltage comparison module 232 that correspond to the control signals provided to the PMU 102 via the control signal line 106. The feedback signals from the voltage comparison module 232 can also be subjected to various signal processing function by filter loops 338 of the reference voltage calculation module 230 as illustrated in FIG. 3.

After steps 508, the flowchart 500 transitions to step 510, where the switch control module 112 generates one or more control signals based on a comparison of the reference voltage ($V_{ref}$) and the sensed voltages that were subjected to the various signal processing functions by, for example, the feedback filter module 450. For example, the switch control module 112 can include a reference voltage ($V_{ref}$) generation module 452 that performs the comparison to generate the control signals. Further, in an exemplary embodiment, the control signals are pulse-width modulated (PMW) control signals.

After steps 510, the flowchart 500 transitions to step 512, where the switch control module 112 outputs the control signals generated in step 510 to the power train module 11C of the PMU 102 to control the regulation of the output voltage generated by the power train module 110 of the PMU 102. For example, the reference voltage ($V_{ref}$) generation module 452 outputs the control signals to the power train module 110 of the PMU 102 to control the output voltage ($V_{out}$) from the power train module 110 of the PMU 102.

After step 512, the flowchart 500 transitions to step 514, where the flowchart 500 ends.

Figure 6:
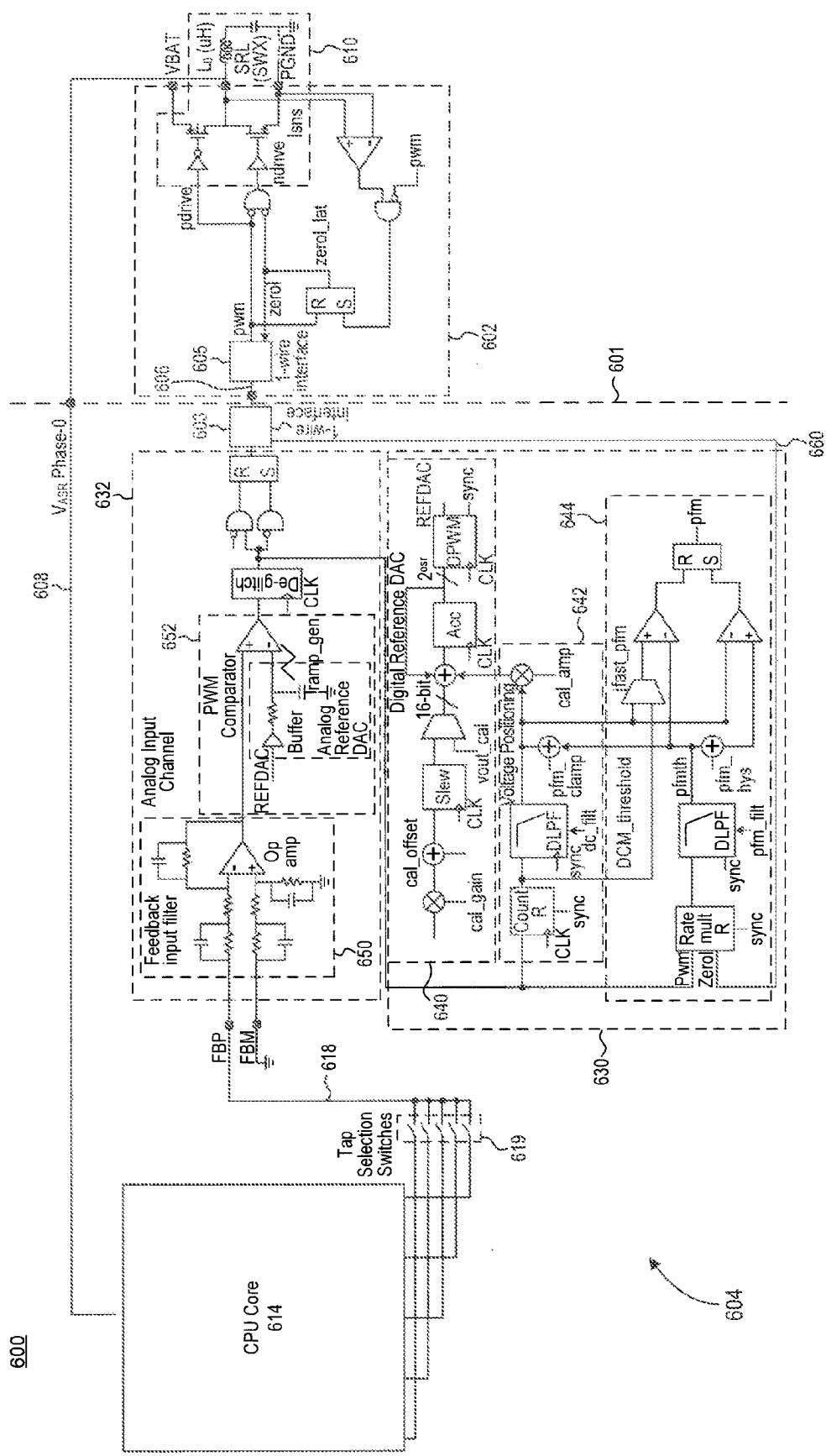
FIG. 6 illustrates a power management system in accordance with an exemplary embodiment of the present disclosure.

FIG. 6 illustrates a power management system 600 in accordance with an exemplary embodiment of the present disclosure. The system 600 includes a power management unit (PMU) 602 communicatively and electrically coupled to an application processor 604 via control signal line 606 and output voltage ($V_{out}$) supply line 608, respectively. The power management unit (PMU) 602, application processor 604, control signal line 606, and output voltage ($V_{out}$) supply line 608 are each an exemplary embodiment of the PMU 102, application processor 104, control signal line 106, and output voltage ($V_{out}$) supply line 108, respectively, the of power management system 100 of FIG. 1.

In an exemplary embodiment, the control signal line 606 is formed by a single wire that connects a single-wire interface 603 of the application processor 604 and a single-wire interface 605 of the PMU 602. By utilizing a single-wire connection, the total number of signal lines that connect the PMU 602 and the application processor 604 remains low when the application processor 604 includes multiple CPU cores.

In an exemplary embodiment, the PMU 602 is formed utilizing a larger manufacturing process technology with respect to the manufacturing process technology implemented for the application processor 604. As a result, the PMU 102 is formed on (or includes) a semiconductor substrate of a first type having a first feature size and the application processor 104 is formed on (or includes) a semiconductor substrate of a second type having a second feature size, where the first feature size is larger than the second feature size. For example, the PMU 602 is formed utilizing a 0.18 μm manufacturing process technology while the application processor 604 is formed utilizing, for example, a 28 nm, 20 nm, or the like manufacturing process technology. In this configuration, communication signal paths and electrical connections between the PMU 602 and the application processor 604 traverse a partition 601 defined by the different manufacturing process technologies.

The PMU 602 includes suitable logic, circuitry, and/or code that is configured to govern various power functions, including, for example, regulating an output voltage, measuring the voltage of one or more power sources (e.g., a battery, AC voltage source, etc.), and/or charging one or more battery power sources, for example $V_{BAT}$.

In an exemplary embodiment, the PMU 602 includes a power train module 610 that includes suitable logic, circuitry, and/or code that is configured to provide a regulated output voltage ($V_{out}$) from a varying input voltage. The power train module 610 is an exemplary embodiment of the power train module 110 of FIG. 1. The input voltage can be provided from an AC voltage source and/or a DC voltage source (e.g., a battery). The power train module 610 includes one or more power switches (e.g., field effect transistors (FET), bipolar junction transistors (BJT), or the like) and an inductor-capacitor (LC) filter coupled between the unregulated input voltage source and the regulated output. In operation, the control of the power switches of the power train module 610 is based on control signals received by the power train module 610 from the application processor 604 (e.g. from a switch control module 612 as discussed below).

In an exemplary embodiment, the PMU 602 is configured as a buck converter, a boost converter, or a buck-boost converter. As discussed in more detail below, and similar to the operation of the power management system 100 of FIG. 1, the power train module 610 does not include control circuitry to control the regulation of voltage, nor is the control circuitry included in the PMU 602. Rather, the application processor 604 is configured to monitor and control the regulation of the output voltage ($V_{out}$) of the power train module 610 of the PMU 602.

The application processor 604 includes suitable logic, circuitry, and/or code that is configured to carry out instructions to perform arithmetical, logical, and/or input/output (I/O) operations of one or more components of the power management system 600, govern various power management functions of the power management system 600 by controlling the operations of the PMU 602 via the control signal line 606.

In an exemplary embodiment, the application processor 604 includes a central processing unit (CPU) core 614 configured to perform the one or more operations, and a voltage comparison module 632 and reference voltage calculation module 630, which are configured to cooperatively govern various power management functions of the power management system 600, including monitoring one or more points within the application processor 604 and controlling the regulation of output voltage ($V_{out}$) of the PMU 602 (power train circuit 610) based on the results of such monitoring. The voltage comparison module 632 and reference voltage calculation module 630 are each an exemplary embodiment of the voltage comparison module 232 and reference voltage calculation module 230 of FIG. 2, respectively.

In controlling the regulation of the output voltage ($V_{out}$), application processor 604 is configured to provide a control signal to the power train module 610 via the control signal line 606. In an exemplary embodiment, the application processor 604 uses one or more pulse-width modulated (PWM) signals to control the operation of the PMU 602, including the operation of the power train module 610.

In operation, the application processor 604 is configured to monitor the sensed voltages at one or more points within the CPU core 614 via a voltage sensing signal line 618. Based on the monitoring of the sensed voltages, the application processor 604 adjusts, via one or more control signals transmitted to the PMU 602 via the control signal line 606, the regulation of the output voltage ($V_{out}$) provided by the PMU 602 via the output voltage supply line 608.

With continued reference to FIG. 6, the reference voltage calculation module 630 includes a low-frequency filter loop 640, a high-frequency filter loop 642, and a discontinuous mode filter loop 644, which collectively are referred to as filter loops 638. The low-frequency filter loop 640, high-frequency filter loop 642, and discontinuous mode filter loop 644 are each an exemplary embodiment of the low-frequency filter loop 340, high-frequency filter loop 342, and discontinuous mode filter loop 344 of FIG. 3, respectively.

The low-frequency filter loop 640, the high-frequency filter loop 642, and the discontinuous mode filter loop 644 each include suitable logic, circuitry, and/or code that is configured to perform various signal processing functions, including, for example, filtering, digital-to-analog conversion (DAC), analog-to-digital conversion (ADC), slew rate calculation, pulse-width modulation (PWM), amplification, or the like, on feedback signals received from the voltage comparison module 632 (e.g., on signals corresponding to the control signals transmitted via control signal line 606 to the PMU 602). The various signal processing by the low-frequency filter loop 640, high-frequency filter loop 642, and discontinuous mode filter loop 644 generates a digital reference voltage signal (REFDAC) that is used by the voltage comparison module 632 to generate the reference voltage ($V_{ref}$).

The low-frequency filter loop 640, high-frequency filter loop 642, and discontinuous mode filter loop 644 are similar to the low-frequency filter loop 340, high-frequency filter loop 342, and discontinuous mode filter loop 344 of FIG. 3, respectively. In particular, the low-frequency filter loop 640 is configured to perform one or more of the various signal processing functions as discussed above on low-frequency signals feedback to the filter loops 638. Similarly, the high-frequency filter loop 642 is configured to perform one or more of the various signal processing functions as discussed above on high-frequency signals supplied to the filter loops 638. The discontinuous mode filter loop 644 is configured to perform one or more of the various signal processing functions as discussed above on signals supplied to the filter loops 638 when the PMU 602 is operating in a discontinuous mode. The PMU 602 operates in a discontinuous mode when the current through an inductor of an LC filter of the power train module 610 is zero or substantially zero (i.e., a high impedance state). An indication that the PMU 602 is operating in a discontinuous mode is provided to the application processor 604, and particularly to the discontinuous mode filter loop 644, from the single-wire interface 603 via ZeroI signal line 660.

In an exemplary embodiment, the voltage comparison module 632 includes suitable logic, circuitry, and/or code that is configured to monitor voltages at one or more points within the application processor 604 (e.g., within the CPU core 614) via the voltage sensing signal line 618, and to control the regulation of the output voltage ($V_{out}$) from the PMU 602 based on the monitored voltages at the one or more points and the digital reference voltage signal (REFDAC) provided by the reference voltage calculation module 630. The voltage comparison module 632 controls the voltage regulation of the PMU 602 by providing one or more control signals to the PMU 602 via the control signal line 606.

In an exemplary embodiment, the voltage comparison module 632 includes a feedback filter module 650 and a reference voltage ($V_{ref}$) generation module 652. The feedback filter module 650 and reference voltage ($V_{ref}$) generation module 652 are each exemplary embodiments of the feedback filter module 450 and reference voltage ($V_{ref}$) generation module 452 of FIG. 4, respectively.

The feedback filter module 650 includes suitable logic, circuitry, and/or code that is configured to perform various signal processing functions, including, for example, filtering and/or amplification. In an exemplary embodiment, the feedback filter module 650 is configured as an active filter that includes an operational amplifier having one or more capacitors and/or resistors connected to the inputs of the operational amplifier, and one or more capacitors and/or resistors connected between the output and the inverted input of the operational amplifier. Further, the inverted input of the operational amplifier is selectively connected to one or more points within the CPU core 614 via tap selection switches 619, while the non-inverted input is connected to ground. Accordingly, the feedback filter module 650 operates to filter the sensed voltages that are measured from the CPU core 614 by the selection switches 619. The output of the operational amplifier is connected to the reference voltage generation module 652 to supply a filtered signal (corresponding to the sensed voltages) to the reference voltage generation module 652.

The reference voltage ($V_{ref}$) generation module 652 includes suitable logic, circuitry, and/or code that can be configured to generate a control signal based on a comparison of the sensed voltages and a reference voltage ($V_{ref}$), where the reference voltage ($V_{ref}$) is generated using the digital reference voltage signal (REFDAC) provided by the reference voltage calculation module 630.

In an exemplary embodiment, the reference voltage ($V_{ref}$) generation module 652 includes an operational amplifier configured to compare a filtered signal (e.g., signal corresponding to the sensed voltages) from the feedback filter module 650 with the digital reference voltage signal (REFDAC) provided by the reference voltage calculation module 630. The reference voltage ($V_{ref}$) generation module 652 generates the control signal provided to the PMU 602 based on the comparison. The reference voltage ($V_{ref}$) generation module 652 also includes a ramp generator circuit to generate a ramp voltage based on the digital reference voltage signal (REFDAC) provided by the reference voltage calculation module 630. The control signal provided to the PMU 602 by the reference voltage ($V_{ref}$) generation module 652 is used to adjust the regulation of the output voltage ($V_{out}$) provided by the PMU 602 via the output voltage supply line 608.

CONCLUSION

The aforementioned description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A power management system, comprising:
an application processor including a switch control module configured to generate a control signal based on a comparison of a reference voltage and at least one of a plurality of monitored voltages within the application processor, wherein the reference voltage is generated based on a feedback signal corresponding to the control signal; and
a power management unit (PMU) configured to generate a regulated output voltage based on the control signal, wherein the PMU and the application processor are formed utilizing different size manufacturing process technologies.

2. The power management system according to claim 1, wherein the PMU is formed utilizing a larger feature size manufacturing process technology than that of the application processor.

3. The power management system according to claim 2, wherein the PMU is formed utilizing a 0.18 micrometer manufacturing process technology and the application processor is formed utilizing a 28 nanometer or less manufacturing process technology.

4. The power management system according to claim 1, wherein the switch control module is configured to locally monitor the plurality of monitored voltages within the application processor.

5. The power management system according to claim 4, wherein the switch control module includes a reference voltage generation module configured to generate the reference voltage and to generate the control signal based on the comparison of the reference voltage with the at least one of the plurality of monitored voltages.

6. The power management system according to claim 1, wherein the switch control module includes one or more filter loops configured to filter the feedback signal corresponding to the control signal.

7. the power management system according to claim 6, wherein the filter loops include:
a low-frequency filter loop configured to filter one or more low-frequency components of the feedback signal;
a high-frequency filter loop configured to filter one or more high-frequency components of the feedback signal, and
a discontinuous mode filter loop configured to filter the feedback signal when the PMU is operating in a discontinuous mode.

8. The power management system according to claim 1, wherein the control signal is a pulse-width modulated (PWM) control signal.

9. An application processor, comprising:
a central processing unit (CPU) core; and
a control module configured to:
locally monitor one or more voltages within the CPU core, and
generate a control signal based on a comparison of a reference voltage and at least one of the one or more monitored voltages to adjust a regulated voltage supplied to the application processor by an externally-located power management unit (PMU),
wherein the reference voltage is generated based on a feedback signal corresponding to the control signal.

10. The application processor according to claim 9, wherein the control module is configured to generate the control signal based on two or more monitored voltages and to provide the control signal to the PMU.

11. The application processor according to claim 9, wherein the control module further comprises a reference voltage generation module, the reference voltage generation module being configured to:
generate the reference voltage;
compare the reference voltage with the at least one of the one or more monitored voltages; and
generate the control signal based on the comparison of the reference voltage and the at least one of the one or more monitored voltages.

12. The application processor according to claim 9, wherein the control module further comprises filter loops configured to filter the feedback signal, the filter loops comprising:
a low-frequency filter loop configured to filter one or more low-frequency components of the feedback signal;
a high-frequency filter loop configured to filter one or more high-frequency components of the feedback signal, and
a discontinuous mode filter loop configured to filter the feedback signal when the PMU is operating in a discontinuous mode.

13. The application processor according to claim 9, wherein the PMU is formed on a first semiconductor substrate type having a first feature size, and the application processor is formed on a second semiconductor substrate type having a second feature size.

14. The application processor according to claim 13, wherein the first feature size is larger than the second feature size.

15. A power management method, comprising:
sensing one or more internal voltages of an application processor;
generating, by the application processor, a reference voltage and a control signal, wherein the generation of the control signal is based on a comparison of the reference voltage and the sensed internal voltages, and wherein the generation of the reference voltage is based on a feedback signal corresponding to the control signal; and
transmitting the control signal to a power management unit (PMU) to adjust a regulated voltage generated by the PMU, wherein the PMU is located on a separate substrate than that of the application processor.

16. The method of claim 15, wherein the PMU is formed utilizing a larger feature size manufacturing process technology than that of the application processor.

17. The method of claim 16, wherein the PMU is formed utilizing a 0.18 micrometer manufacturing process technology and the application processor is formed utilizing a 28 nanometer or less manufacturing process technology.

18. The method of claim 15, wherein the PMU is formed on a first semiconductor substrate type having a first feature size, and the application processor is formed on a second semiconductor substrate type having a second feature size.

19. The method of claim 18, wherein the first feature size is larger than the second feature size.

20. The method of claim 15, wherein the control signal is a pulse-width modulated (PWM) control signal.

\* \* \* \* \*